(12) United States Patent
Zutis

(10) Patent No.: US 8,925,156 B2
(45) Date of Patent: Jan. 6, 2015

(54) ATTACHABLE FASTENER SHIELD

(76) Inventor: Cerena West Zutis, San Mateo, CA (US)

( * ) Notice: Subject to any disclaimer, the term of this patent is extended or adjusted under 35 U.S.C. 154(b) by 216 days.

(21) Appl. No.: 13/615,602

(22) Filed: Sep. 14, 2012

(65) Prior Publication Data

US 2014/0075722 A1    Mar. 20, 2014

(51) Int. Cl.
*A44B 11/00*    (2006.01)
*A44B 99/00*    (2010.01)

(52) U.S. Cl.
USPC ........... 24/1; 24/163 R; 24/163 K; 24/163 FC

(58) Field of Classification Search
CPC ... A44B 11/005; A44B 11/25; A44B 17/0064
USPC ..... 24/163 R, 1, 163 FC, 573.09, 574.1, 570, 24/163 K; 206/206, 338
See application file for complete search history.

(56) References Cited

U.S. PATENT DOCUMENTS 4,939,824 A * 7/1990 Reed ............................... 24/633
6,647,656 B2 * 11/2003 Mazzagetti ....................... 42/85

* cited by examiner

*Primary Examiner* — Jack W Lavinder
(74) *Attorney, Agent, or Firm* — Sheri Lynn Gish

(57) ABSTRACT

In one aspect, an attachable fastener shield includes a flat pad having a length and a width that are at least as long and at least as wide as dimensions of a particular fastener; and one or more loops, each loop being attached to the pad top surface at one or more pairs of points, each pair of points being separated by a horizontal distance that is smaller than the pad width. The attachable fastener shield is configured to be attached to the particular fastener by fitting the particular fastener under the one or more loops and above the top surface of the pad.

12 Claims, 4 Drawing Sheets

ATTACHABLE FASTENER SHIELD

FIELD OF INVENTION

This specification relates to an attachable shield for a fastener.

BACKGROUND

Dog harnesses are one example of equipment designed to include strapping material, e.g., leather or one of a variety of textiles, and one or more fasteners for the straps. The basic design of a harness typically includes strapping positioned around a dog's body behind the foreleg pits/elbows and around the front of the chest or neck. A common fastener used for one or more of the harness straps is a buckle. There are a variety of different types of buckle. One type of buckle is a metal "belt buckle" that is integrated with one end of a strap to be fastened. More recently, a two-part side-release buckle has become the most common type of fastener used in harnesses. Side-release buckles may be made of hard plastic or metal.

The buckles used in a dog harness may cause a number of problems, even when the dog harness is properly fit and properly used. One common problem, especially seen in short-coated dogs, is the buckle rubbing against the dog's body and causing injuries such as the wearing off of the hair beneath the buckle, skin irritation, skin abrasion, and raw sores. Another common problem, especially for long-coated dogs, is the dog's hair getting caught when the two parts of a side-release buckle are snapped together. Hair caught in the buckle may be pulled and, in turn, pull the skin causing discomfort and pain.

SUMMARY

In one aspect, an attachable fastener shield includes a flat pad having a length and a width that are at least as long and at least as wide as dimensions of a particular fastener; and one or more loops, each loop being attached to the pad top surface at one or more pairs of points, each pair of points being separated by a horizontal distance that is smaller than the pad width. The attachable fastener shield is configured to be attached to the particular fastener by fitting the particular fastener under the one or more loops and above the top surface of the pad.

In another aspect, an attachable shield for a side-release buckle shield includes a flat pad having a length and a width that are at least as long and at least as wide as dimensions of a particular side-release buckle; and one or more loops, each loop being attached to the pad top surface at one or more pairs of points, each pair of points being separated by a horizontal distance that is smaller than the pad width. The attachable shield is configured to be attached to the particular side-release buckle by fitting the female part of the particular side-release buckle under the one or more loops and above the top surface of the pad.

Certain implementations may include one or more of the following features. An attachable shield may be detached from a particular fastener by removing the particular fastener from under the one or more loops. The attachable shield may be attached to a different second fastener by fitting the second fastener under the one or more loops and above the top surface of the pad. An attachable shield may further include one or more slots, each slot penetrating the top and bottom surfaces of the pad, wherein each of the one or more slots is associated with a corresponding one or more loops, and wherein each slot is positioned on the pad beneath its associated one or more loops. Attaching the shield to the particular fastener may further include fitting the particular fastener into the one or more slots. The one or more loops may be part of the pad. The pad may include one or more slots, each slot penetrating the top and bottom surfaces of the pad. Each of the one or more slots is associated with a corresponding one or more loops, and each slot is positioned on the pad beneath its associated one or more loops.

Particular embodiments of the subject matter described in this specification can be implemented so as to realize one or more of the following advantages.

A shield can be attached to any fastener to provide protection against the fastener rubbing against a body. Attachment of a shield to a strap fastener can be used improve the general fit of the strap because it allows the strap to be tightened further without the risk of the fastener digging in and rubbing against the body.

A shield is portable, and can be carried as an accessory to be added as needed. For example, backpacks typically include straps with fasteners. Adding weight to a backpack may cause straps to tighten and thus cause friction between the fasteners and the body. An attachable shield can be added as needed to provide protection from this friction. The attachable shield can be removed when the protection is no longer needed.

The two parts of a side-release buckle snap together when it is fastened. The shield fits under both parts of a side-release buckle, providing protection from any pinching of skin that may be caught between the parts of the buckle as it is fastened. The shield creates a "hair barrier" that blocks animal hair from being caught between the fitting ends of a side-release buckle. The shield also provides protection against any chafing or abrasion from the buckle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
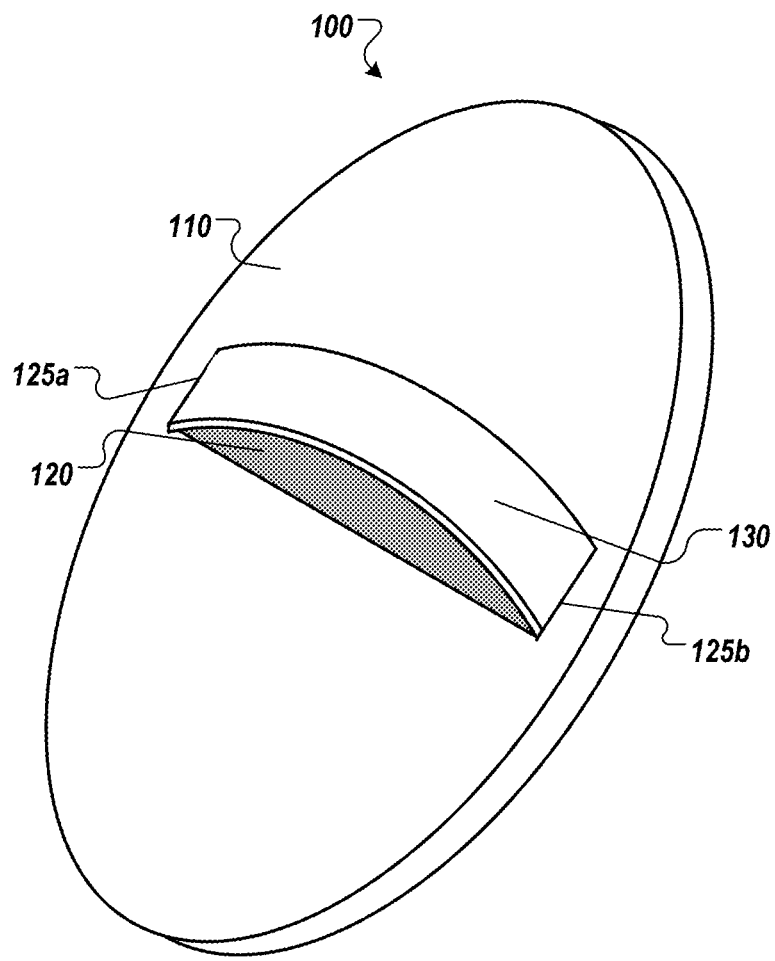
FIG. 1 illustrates a top view of an implementation of an attachable fastener shield.
Figure 2:
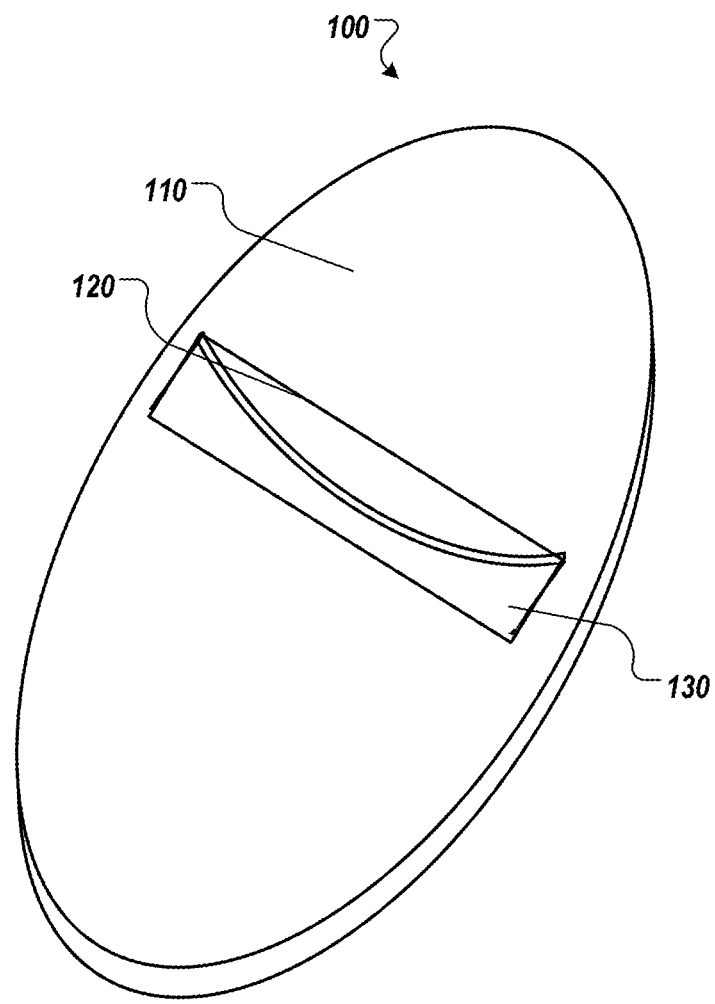
FIG. 2 illustrates a bottom view of an implementation of an attachable fastener shield.

FIG. 1 and FIG. 2 illustrate top and bottom views, respectively, of an implementation of an attachable fastener shield 100. The shield 100 includes a flat pad 110 and a loop 130, which is a strip that is attached to the top surface of the pad 110 by a pair of attachment points 125a and 125b. The pair of loop attachment points 125a and 125b are oriented parallel to the width axis of the pad 110 and separated by a distance that is less than the width of the pad 110. The pad 110 is configured to have a slot 120 penetrating both the top surface and the bottom surface of the pad 110. The slot 120 is positioned on the pad beneath the loop 130. In some implementations, the loop 130 is part of the pad, and the slot 120 is formed by cutting the loop 130 from the pad 110. In some alternative implementations, the loop 130 is a separate piece from the pad 110 and attached to the top surface of the pad 110 at the pair of attachment points 125*a* and 125*b*. In some alternative implementations, the pad 110 is not configured to include a slot 120.

In some implementations, a loop 130 is attached to the pad 110 by two or more pairs of attachment points. For example, a loop 130 may be "X" shaped and attach to the pad by two pairs of attachment points.

In some implementations, a shield 100 is configured to include more than one loop 130. For example, a shield may be configured to include several loops, each of which is oriented parallel to the width axis of the pad. In a second example, a shield may be configured to include one or more pairs of loops, with each pair of loops being attached to the pad 110 in a crisscross pattern, e.g., an "X" pattern. In some implementations configured to include more than one loop 130, the pad 110 is configured to include one or more slots 120, each of which is associated with a corresponding one or more loops and positioned beneath the associated one or more loops.

In some implementations, the pad 110 and a loop 130 may be constructed of a sturdy, soft, flexible material such as, for example, neoprene, leather, soft polyurethane foam, padded cloth, or the like, or any combination thereof. In some implementations, the pad 110 and a loop 130 may be constructed of different materials.

Figure 3:
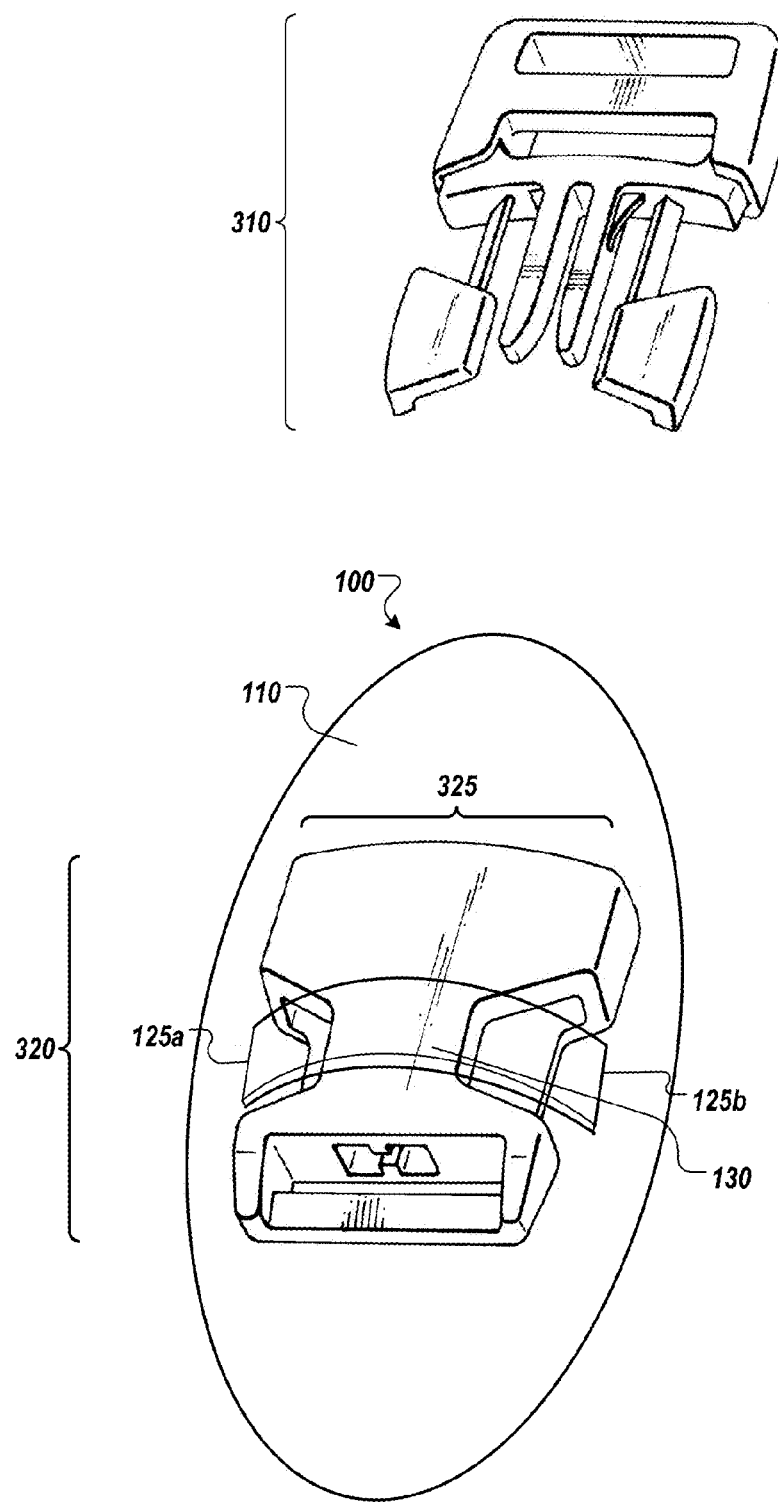
FIG. 3 illustrates an example of an implementation of an attachable fastener shield attached to an unfastened side-release buckle.

FIG. 3 illustrates an example of an implementation of an attachable fastener shield 100 that is attached to an unfastened side-release buckle. The unfastened side-release buckle has a male part 310 and a female part 320. The shield 100 is attached to the female part 320 of the side-release buckle. In some implementations, an attachable fastener shield 100 is configured to form an optimally snug fit to a particular type of fastener. Referring to the example illustrated in FIG. 3, the shield 100 is configured so that the horizontal distance between the shield loop's pair of attachment points 125*a* and 125*b* is smaller than the width 325 of the widest part of the female part 320 of the buckle. Thus, the loop 130 will fit snugly over the narrower "waist" of the female part 320 of the buckle, minimizing the likelihood of movement of the buckle against the pad 110. As depicted in FIG. 1, the positioning of a slot 120 in the pad 110 beneath the loop 130 further ensures a snug attachment of the shield to a fastener such as a buckle, because the part of the fastener fitted under the loop 130 also is fitted into the slot 120 in the pad 110. Fitting a part of the fastener into the slot 120 minimizes the protrusion of that part of the fastener above the top surface of the pad 110, thereby reducing the amount of loop tension necessary to hold the fastener in place against the pad.

Figure 4:
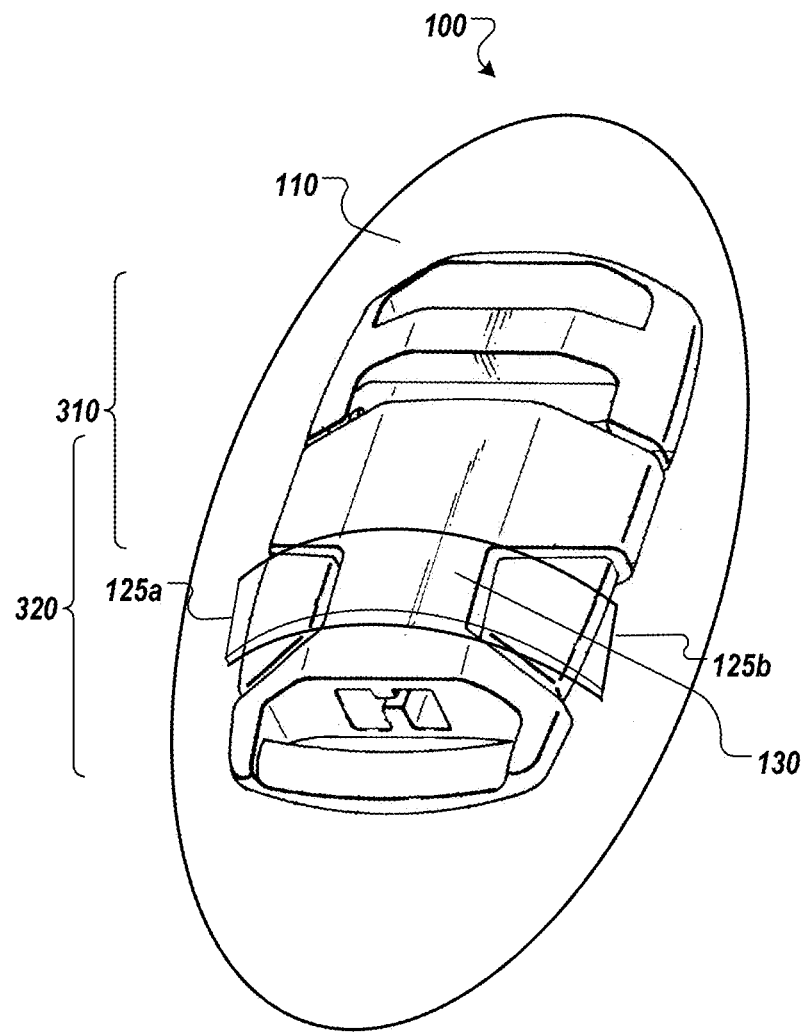
FIG. 4 illustrates an implementation of an attachable fastener shield attached to a fastened side-release buckle.

FIG. 4 illustrates an example of an implementation of an attachable fastener shield 100 that is attached to a fastened side-release buckle. The side-release buckle is fastened by fitting the prongs of the male part 310 into slots of the female part 320. As illustrated, the buckle is fastened over the top surface of the pad 110, fitting the shield 100 beneath both parts 310 and 320 of the fastened buckle. In various implementations, the dimensions of the pad 110 are at least as wide and at least as long as the dimensions of the fastener. Thus, the shield 100 is positioned below the entire bottom surface of the fastener when it is fastened.

A number of embodiments of the invention have been described. Nevertheless, it will be understood that various modifications may be made without departing from the spirit and scope of the invention. For example, while the figures indicate a shield attaching to one part of a two-part fastener, a shield also may be attached to a fastener, such as a belt buckle, that is integrated with a strap. In that case, the fastener is fit under the shield loop and above the shield surface at the attachment point between the fastener and the strap. When the other end of the strap is inserted into the fastener, the shield will be positioned beneath the fastener and both ends of the strap.

What is claimed is:

1. An attachable fastener shield for providing a barrier for protection against any pinching, chafing, or abrasion from a fastener, comprising:
    a flat pad having a length and a width that are similar to the dimensions of the fastener; and
    one or more loops, wherein each loop is attached to the pad top surface at one or more pairs of points, each pair of points being separated by a horizontal distance that is smaller than the pad width; and
    wherein the shield is configured to be attached to the fastener bottom surface by fitting the fastener under the one or more loops and above the top surface of the pad before fastening the fastener above the top surface of the pad.

2. The attachable fastener shield of claim 1, wherein the shield is configured to be detached from the fastener by removing the fastener from under the one or more loops after unfastening the fastener.

3. The attachable fastener shield of claim 1, wherein the pad comprises:
    one or more slots, each slot penetrating the top and bottom surfaces of the pad, wherein each of the one or more slots is associated with a corresponding one or more loops, and wherein each slot is positioned on the pad beneath its associated one or more loops.

4. The attachable fastener shield of claim 3, wherein fitting the fastener under the one or more loops and above the top surface of the pad further comprises fitting the fastener into the one or more slots.

5. The attachable fastener shield of claim 3, wherein each of the one or more loops is part of the pad.

6. An attachable shield for providing a barrier for protection against any pinching, chafing or abrasion from a side-release buckle, comprising:
    a flat pad having a length and a width that are similar to the dimensions of the side-release buckle; and
    one or more loops, wherein each loop is attached to the pad top surface at one or more pairs of points, each pair of points being separated by a horizontal distance that is smaller than the width of the widest part of the female part of the buckle; and
    wherein the shield is configured to be attached to the bottom surface of the side-release buckle by fitting the female part of the side-release buckle under the one or more loops and above the top surface of the pad before fastening the buckle over the top surface of the pad.

7. The attachable shield of claim 6, wherein the shield is configured to be detached from the side-release buckle by removing the female part of the side-release buckle from under the one or more loops after unfastening the buckle.

8. The attachable shield of claim 6, wherein the pad further comprises:
    one or more slots, each slot penetrating the top and bottom surfaces of the pad, wherein each of the one or more slots is associated with a corresponding one or more loops, and wherein each slot is positioned on the pad beneath its associated one or more loops.

9. The attachable shield of claim 8, wherein fitting the female part of the side-release buckle under the one or more loops and above the top surface of the pad further comprises fitting the female part of the side-release buckle into the one or more slots.

10. The attachable shield of claim 8, wherein each of the one or more loops is part of the pad.

11. A method for providing a barrier for protection against any pinching, chafing, or abrasion from a side-release buckle having a male part and a female part, the method comprising:

attaching a shield to the female part of the side-release buckle by affixing the female part of the side-release buckle to the top surface of the shield, wherein the shield includes a flat pad having a length and a width that are similar to the dimensions of the side-release buckle; and one or more loops, each loop being attached to the pad top surface at one or more pairs of points, each pair of points being separated by a horizontal distance that is smaller than the width of the widest part of the female part of the side-release buckle;

fitting the female part of the side-release buckle under the one or more loops and above the top surface of the pad; and fastening the side-release buckle over the top surface of the shield, wherein the shield is positioned below the entire bottom surface of the side-release buckle when the side-release buckle is fastened.

12. The method of claim 11, wherein the shield further includes one or more slots, each slot penetrating the top and bottom surfaces of the pad, wherein each of the one or more slots is associated with a corresponding one or more loops, wherein each slot is positioned on the pad beneath its associated one or more loops; and wherein affixing the female part of the side-release buckle to the top surface of the attachable shield further comprises:

fitting the female part of the side-release buckle into the one or more slots.

* * * * *